United States Patent [19]
Donohue

[11] Patent Number: 5,316,134
[45] Date of Patent: May 31, 1994

[54] CONVEYOR GUIDETRACK SEGMENT

[75] Inventor: William J. Donohue, Brooklandville, Md.

[73] Assignee: Automated Production Systems Corporation, York, Pa.

[21] Appl. No.: 963,989

[22] Filed: Oct. 21, 1992

[51] Int. Cl.5 .............................................. B65G 21/06
[52] U.S. Cl. ................................. 198/861.1; 198/860.2; 198/836.1
[58] Field of Search ............... 198/836.1, 836.3, 860.1, 198/861.2, 861.1

[56] References Cited

U.S. PATENT DOCUMENTS

| | | | |
|---|---|---|---|
| 3,236,363 | 10/1963 | Sutliffe | 198/570 |
| 3,280,962 | 10/1966 | Stone et al. | 198/836.3 |
| 3,368,666 | 2/1968 | Stone | 198/836.1 |
| 3,605,994 | 9/1971 | Parlette | 198/836.1 X |
| 3,800,938 | 4/1974 | Stone | 198/836.3 |
| 3,825,108 | 7/1974 | Stone | 198/861.1 |
| 3,844,405 | 10/1974 | Shuford | 198/836.3 |
| 4,164,283 | 8/1979 | Flajnik | 198/841 X |
| 4,511,031 | 4/1985 | Lachonius | 198/860.2 X |
| 4,961,492 | 10/1990 | Wiseman et al. | 198/841 |
| 4,967,897 | 11/1990 | Lachonius et al. | 198/841 |
| 5,082,108 | 1/1992 | Douglas | 198/836.4 |
| 5,137,145 | 8/1992 | Clopton | 198/860.2 |

Primary Examiner—James R. Bidwell
Attorney, Agent, or Firm—Thomas Hooker

[57] ABSTRACT

A modular conveyor includes a frame made up of a number of series-oriented guidetrack segments and a conveyor belt is mounted on the frame including an upper article-carrying run on the top of the frame and a lower return run located within the frame. The outer surfaces of the frame sidewalls are flat, imperforate and smooth to facilitate cleaning.

11 Claims, 5 Drawing Sheets

CONVEYOR GUIDETRACK SEGMENT

FIELD OF THE INVENTION

The invention relates to elongate conveyor guidetrack segments used in modular conveyors to make a frame. A belt is mounted on the frame including an upper article-carrying run on the top of the frame and a lower return run located within the frame.

DESCRIPTION OF THE PRIOR ART

Modular endless conveyors include a frame made up of a number of series oriented guidetrack segments with an endless conveyor belt fitted on the frame and having an upper article carrying run extending along the top of the frame and a lower return run. Conveyors of this type are used for moving articles of diverse types between spaced locations. Conventional guidetrack segments are formed from sheet metal, of aluminum extrusions, and often include a pair of spaced, interconnected sidewalls. The upper article carrying run extends along the top of the sidewalls and the lower return run is supported on flanges extending inwardly from the sidewalls so that the run is confined within the guidetrack segments.

Most, if not all, conveying applications require that the conveyor must be kept clean. This means the conveyor must be periodically cleaned to remove collected dirt and kill possible bacteria on the conveyor. It is essential to be able to thoroughly clean conveyors used to transport food and health related articles in, for example, food processing plants, medical supply processing plants, and the like.

Cleaning of conventional guidetrack assemblies is made difficult because the sidewalls of these assemblies are curved perforated and include crevices, recesses and openings where dirt and bacteria easily collects but are very difficult to remove. In some guidetrack segments, the brackets for guiderails located to either side of the upper conveyor run are bolted directly to the segment sidewalls using holes extending through the sidewalls or using recesses formed in the sidewalls during manufacture of the segments. The clamped interface between the brackets, the interfaces between the bolts and the holes in the brackets and in the sidewalls and the recesses themselves in the sidewalls all define environments where bacteria and dirt can easily collect and bacteria may grow. It is very difficult indeed to thoroughly clean the dirt and bacteria from these recesses and very small crevices. As a practical matter, it is impossible to thoroughly clean the long frame of a conventional modular conveyor installed in a production facility.

SUMMARY OF THE INVENTION

The invention is an improved guidetrack assembly for use in a modular conveyor, the assembly including a pair of parallel sidewalls with readily cleanable outer surfaces. The upper and lower runs of a conventional conveyor belt are supported by the segments as in a conventional modular conveyor. The segment sidewalls are flat, imperforate recess and free and smooth to facilitate cleaning of the conveyor and preventing collection of dirt and bacteria on the sides of the segments. Guiderails for holding articles on the top run of the conveyor belt are connected to the guidetrack segments by brackets which do not engage the sidewalls but, rather, extend downwardly from the guiderails a distance outwardly from the sidewalls and are mounted to the bottoms of the guidetracks segments, below the sidewalls. In this way, the sidewalls of the segments are maintained free for easy cleaning. Cleaning of the brackets is also facilitated because of the spacing from the sidewalls.

The conveyor frame is mounted on a suitable support, conventionally the worksite floor, by a conveyor support system that is secured to the bottom of the guidetrack segments inwardly of the sidewalls. In this way, suitable support is provided for the container while retaining the desired flat, imperforate and smooth sidewalls.

Other objects and features of the invention will become apparent as the description proceeds, especially when taken in conjunction with the accompanying drawings illustrating the invention, of which there are five sheets and two embodiments.

DESCRIPTION OF THE PREFERRED EMBODIMENTS

Figure 1:
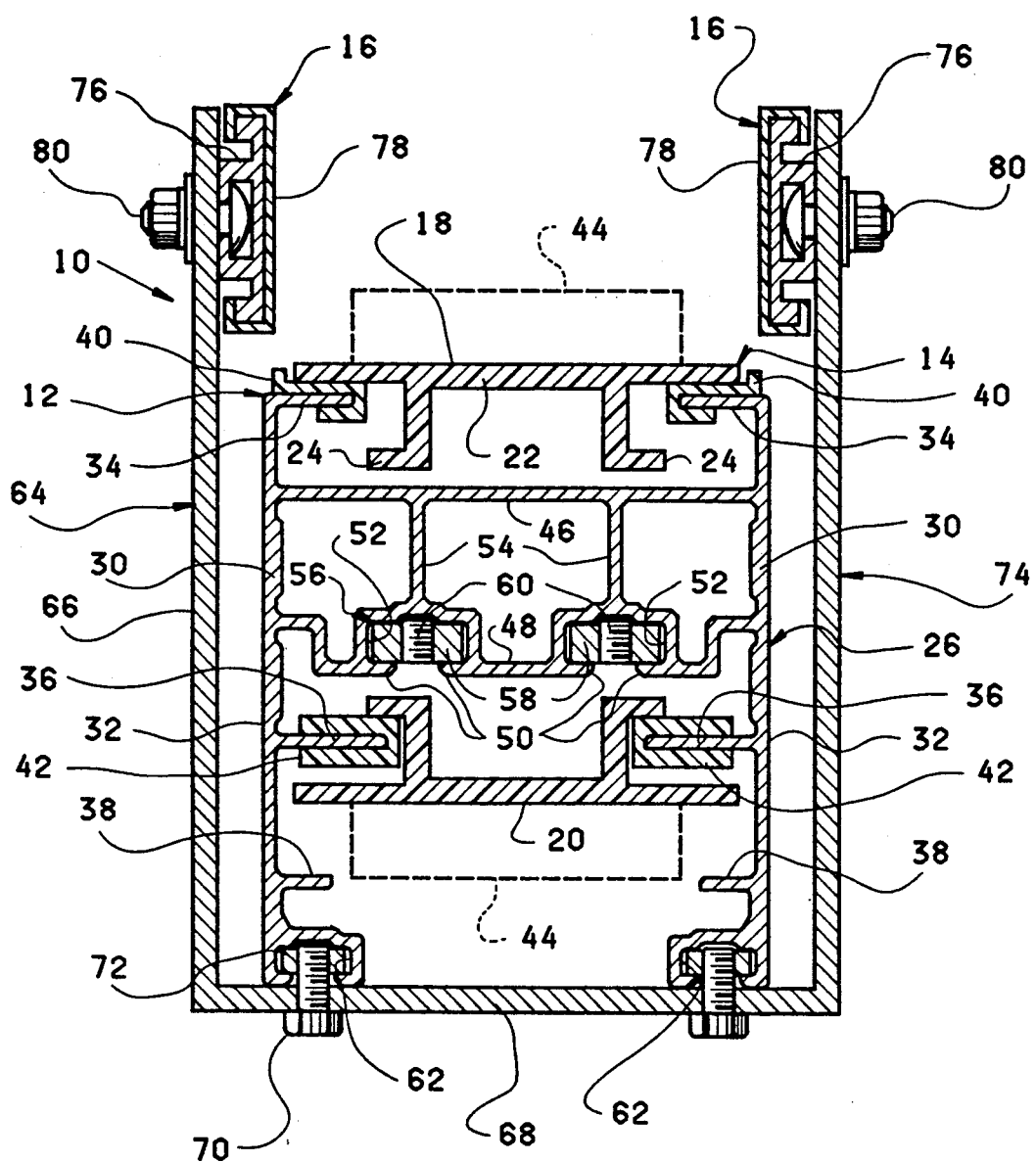
FIG. 1 is a transverse cross-sectional view illustrating a modular conveyor according to the invention.
Figure 2:
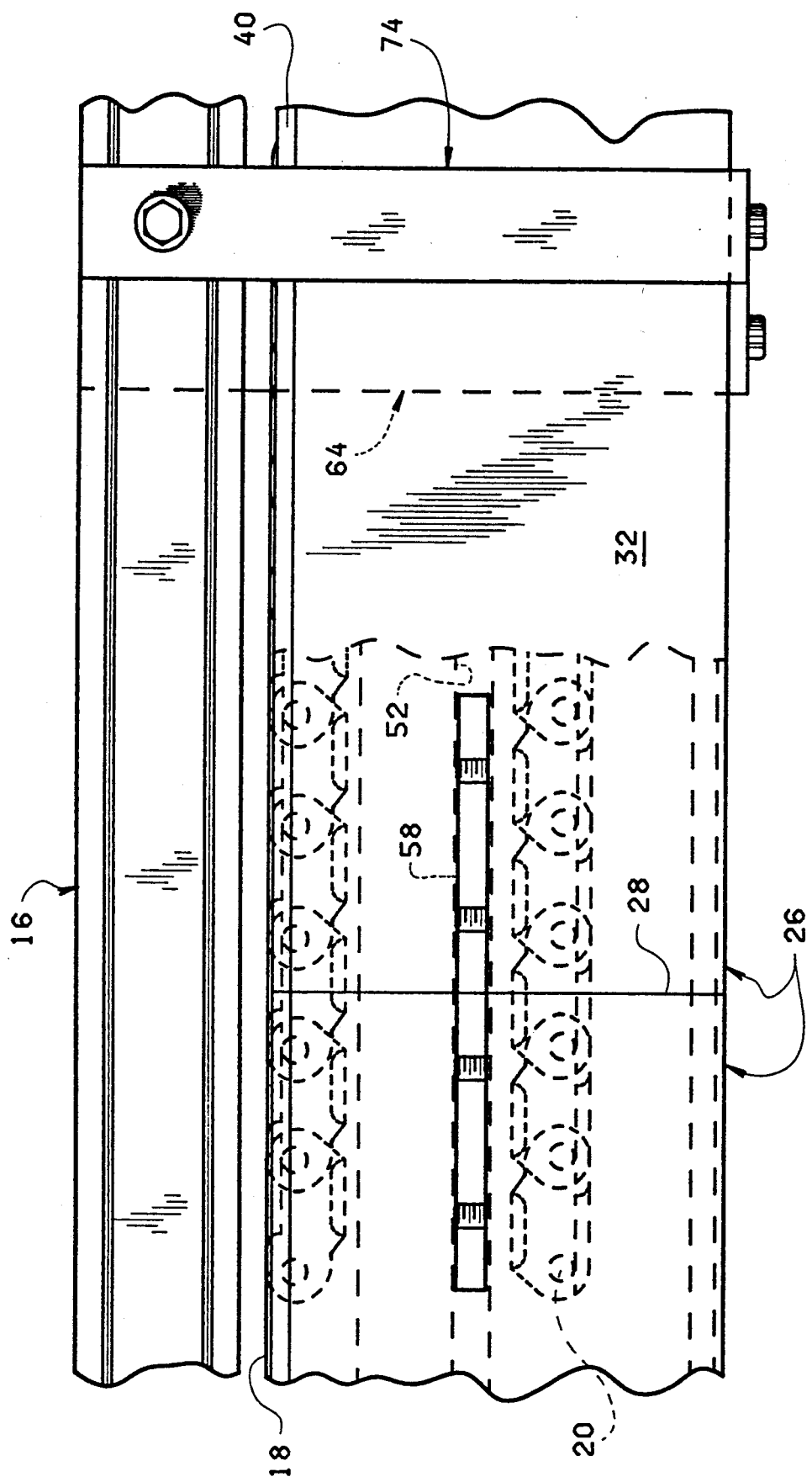
FIG. 2 is a side view of the conveyor shown in FIG. 1.

The first embodiment modular conveyor 10 shown in FIGS. 1 and 2 includes an elongate conveyor frame 12, a continuous conveyor belt 14 moved along the frame and guide rails 16 located above and to either side of the top of the frame. The belt is wrapped around conventional return rollers (not illustrated) at either end of the frame to provide an upper article moving run 18 moving in one direction on the top of the frame and a lower return run 20 located within the frame and running in the opposite direction to the direction of run 18. The conveyor belt 14 is of conventional design and includes a number of discreet conveyor segments loosely linked together, each segment having a relatively wide article support plate 22 and lateral tabs 24 located below the plate. The plate is wider than the tabs. A conventional drive (not illustrated) moves the belt along conveyor frame 12.

The elongate frame is made up of a number of elongate aluminum extruded guidetrack segments 26 joined together at the ends of the adjacent segments at tight vertical joints 28 shown in FIG. 2. Each segment 26 includes a pair of vertical sidewalls 30 which extend from the top to the bottom of the segment and along the length of the segment between adjacent joints 28. The sidewalls define flat, imperforate and smooth sides 32 extending along the length of the frame. Sides 32 are interrupted by the tight vertical joints 28 at the ends of the segments 26.

Figure 3:
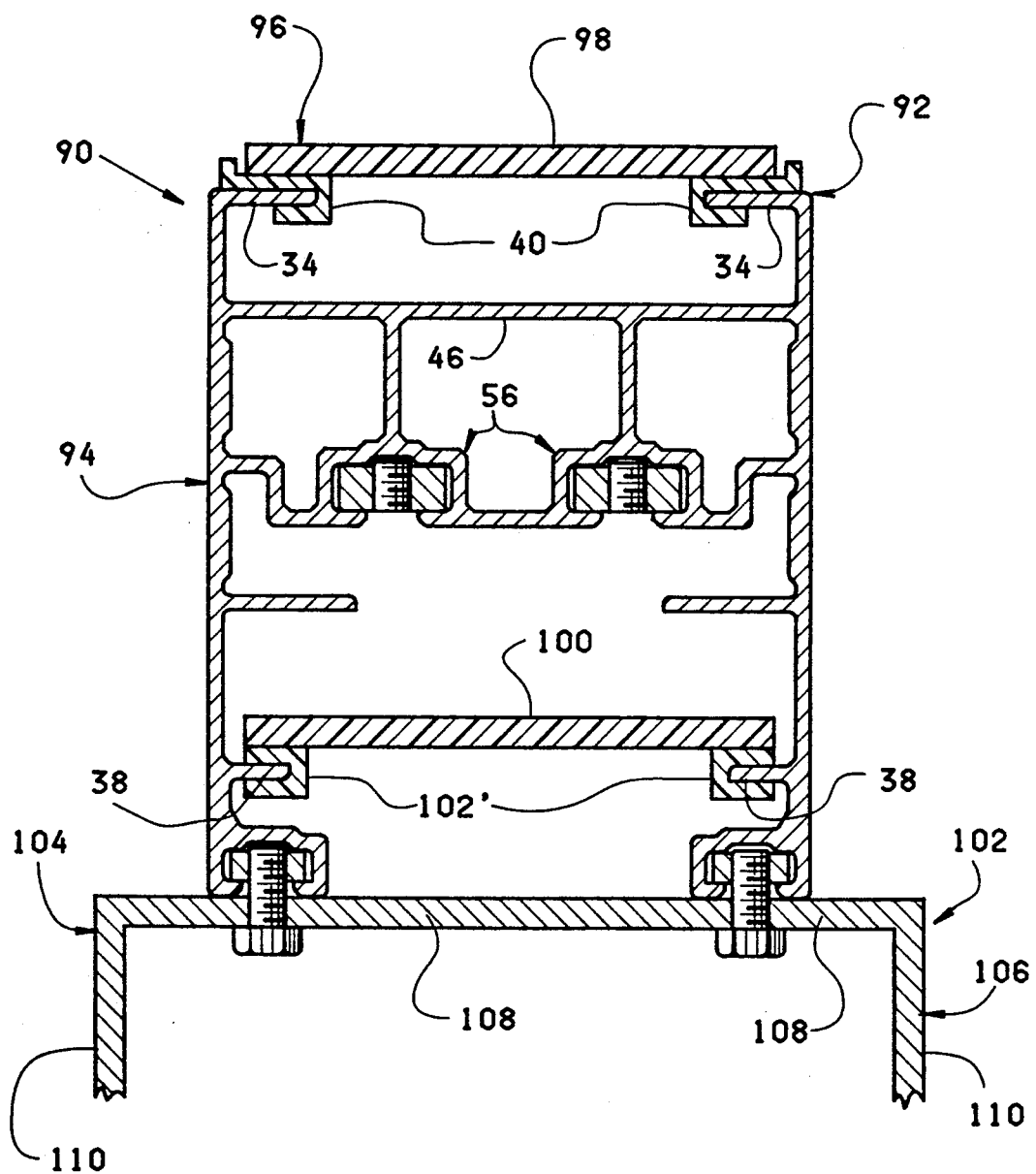
FIG. 3 is a view similar to FIG. 1 illustrating a conveyor using a different belt.

As shown in FIG. 1, each segment 26 is formed from an integral body of extruded aluminum and includes three sets of inwardly extending, opposed conveyor support ribs. The first set of ribs 34 is located at the top of sidewalls 30 and supports the upper run 18 of conveyor belt 14. A second pair of conveyor support ribs 36 extend inwardly from the sidewalls between the top and bottom of the section a distance further than ribs 34 to support the return run 20 of belt 14. A third pair of support ribs 38 are located below ribs 36 and extend inwardly from the sidewalls a distance less than ribs 36. Ribs 38 are used to support the return run of a conveyor belt 96 different than belt 14 as shown in FIG. 3. Ribs 38 extend inwardly from the sidewalls 30 a relatively short distance to permit use of a belt like belt 14 including a article support members 44, shown in dashed lines in FIG. 1, which project above the support plates 22. Members 44 extend above the plate 22 a sufficient distance so that on the return run of the conveyor belt the members extend below, but do not engage, the short ribs 38.

Elongate U-shaped plastic low-friction wear strips 40 are fitted on ribs 34 and support the outer ends of plate 22. The spacing between the wear strips 40 is less than the spacing between tabs 24 to permit ready removal of the upper run of belt 14 for cleaning of the top of the guidetrack. Elongate wear strips 42 are fitted on ribs 36 and support the tabs 24 of the return run of belt 14.

Sidewalls 30 are joined together by two integral members extending across the width of the guidetrack. Horizontal flat plate 46 joins the sidewalls a distance below ribs 34 sufficient to provide clearance with belt tabs 24. The flat plate facilitates cleaning the top of the guidetracks below run 18. The sidewalls are also joined by a zigzagged cross member 48 located below plate 46 and including a number of alternate horizontal and vertical sections to define alternate upwardly facing and downwardly facing recesses extending along the length of the guidetrack segment. The zig-zagged member strengthens the guidetrack segment. Inwardly facing ribs 50 partially close the downwardly facing mouths of recesses 52. The mouths of recesses 52 are laterally offset from ribs 36 and strips 42 to facilitate joining together adjacent segments 26 as described below. Two vertical interior walls 54 join plate 46 to zigzag cross member 48 at the top walls of recesses 52 and further strengthen the guidetrack. The plate 46, cross member 48 and interior walls 54 form a rigid connection joining sidewalls 30.

The guidetrack segments 26 of conveyor frame 12 are arranged end-to-end along the length of the conveyor. Adjacent segments are held together by a pair of spliced joints 56 each including an elongate metal splice connector 58 fitted into the recesses 52 in the ends of each segment. As shown in FIG. 1, the splice connectors 58 have a tight sliding fit within the recesses to assure that the abutting segments 26 are properly aligned and that sidewalls 30 and sides 32 abut and are continuous and the joints 28 are tight. Set screws 60 carried in connectors 58 engage the bottoms of recesses 52 to hold the adjacent segments 26 together and form frame 12. Tools used to tighten the set screws extend freely up past wear strips 42. The belt 14 is installed in the frame after the segments 26 are assembled to form the frame.

Segments 26 include a pair of elongate recesses 62 located inwardly of the lower ends of sidewalls 30. Each guide rail 16 is supported by a plurality of spaced L-shaped brackets mounted to the track segments in recesses 62. As illustrated in FIG. 1, the guide rail 16 located to the left and above the upper conveyor run 18 is supported by a number of spaced L-shaped brackets 64, each having a vertical leg 66 spaced outwardly from the adjacent sidewall 30 and extending upwardly from the bottom of the sidewall to the guide rail. Bracket 64 also includes a horizontal leg 68 that extends under the sidetrack segment 26 and is secured to the bottom of the segment by bolts 70 extending through holes in the leg 68 and engaging nuts 72 closely fitted within the two recesses 62.

The guide rail 16 on the right side of the guidetrack segment is similarly held in place by a plurality of L-shaped brackets 74 having vertical legs and horizontal legs bolted to recesses 62. FIGS. 1 and 2 illustrate that brackets are laterally offset along the length of the guidetrack segments.

The guide rails 16 are of conventional design and include an elongate metal rail 76 and a low friction plastic wear strip 78 facing the upper conveyor run 18. The rails 76 are held to brackets 64, 74 by nut and bolt connections 80.

FIG. 3 illustrates a modular conveyor 90 similar to conveyor 10 having an elongate conveyor frame 92 formed from a number of series connected guidetrack segments 94 identical to segments 26 of conveyor 10. A mat-top conveyor belt 96 is mounted on frame 92 and includes an upper run 98 supported by wear strips 40 mounted on ribs 34 and a lower return run 100 supported by wear strips 102' on ribs 38. The conveyor 90 includes conventional end rollers for reversing the direction of runs 98 and 100 and a conveyor drive for moving the conveyor belt 96.

FIG. 3 also illustrates a typical mounting system 102 which may be used to support either of conveyors 10 or 90. The system includes a pair of L-shaped brackets 104 and 106 each of which includes a horizontal leg 108 extending along the bottom of the guidetrack segment 94 and a vertical leg 110 extending vertically downwardly from the outer end of leg 108. The legs 108 are secured to the bottom of the guidetrack segment 104 by nut and bolt connections 112 identical to connections 70 and 72 securing brackets 64 to segments 26. The adjacent brackets 104 and 106 are laterally offset from each other in the same manner adjacent brackets 64 and 65 are offset from each other as shown in FIG. 2.

Conveyor 90 may also be provided with guide rails, support brackets and connections like those shown in FIG. 1.

The individual guidetrack segments 94 of frame 92 are held together by spliced connections 56, as previously described in connection with conveyor 10.

The outer surfaces of the sidewalls of segments 94 are flat, imperforate, recess free and smooth identical to the outer surfaces of the sidewalls of the guidetrack segments 26 of conveyor 10. The adjacent ends of the sidewalls in the frame 42 form tight vertical joints like joints 28. In both conveyors, the guiderail support brackets, if used, are mounted on the bottom of the guidetrack segments without formation of any openings or holes through the sidewalls, thereby eliminating crevices or openings which are hard to clean where contamination, including bacteria, can collect and grow. Spacing of the guide rail support brackets outwardly from the sides of the conveyor guidetrack eliminates mounting holes and openings where contamination and bacteria may collect and facilitates thorough cleaning of both the sidewalls and the brackets.

Figure 4:
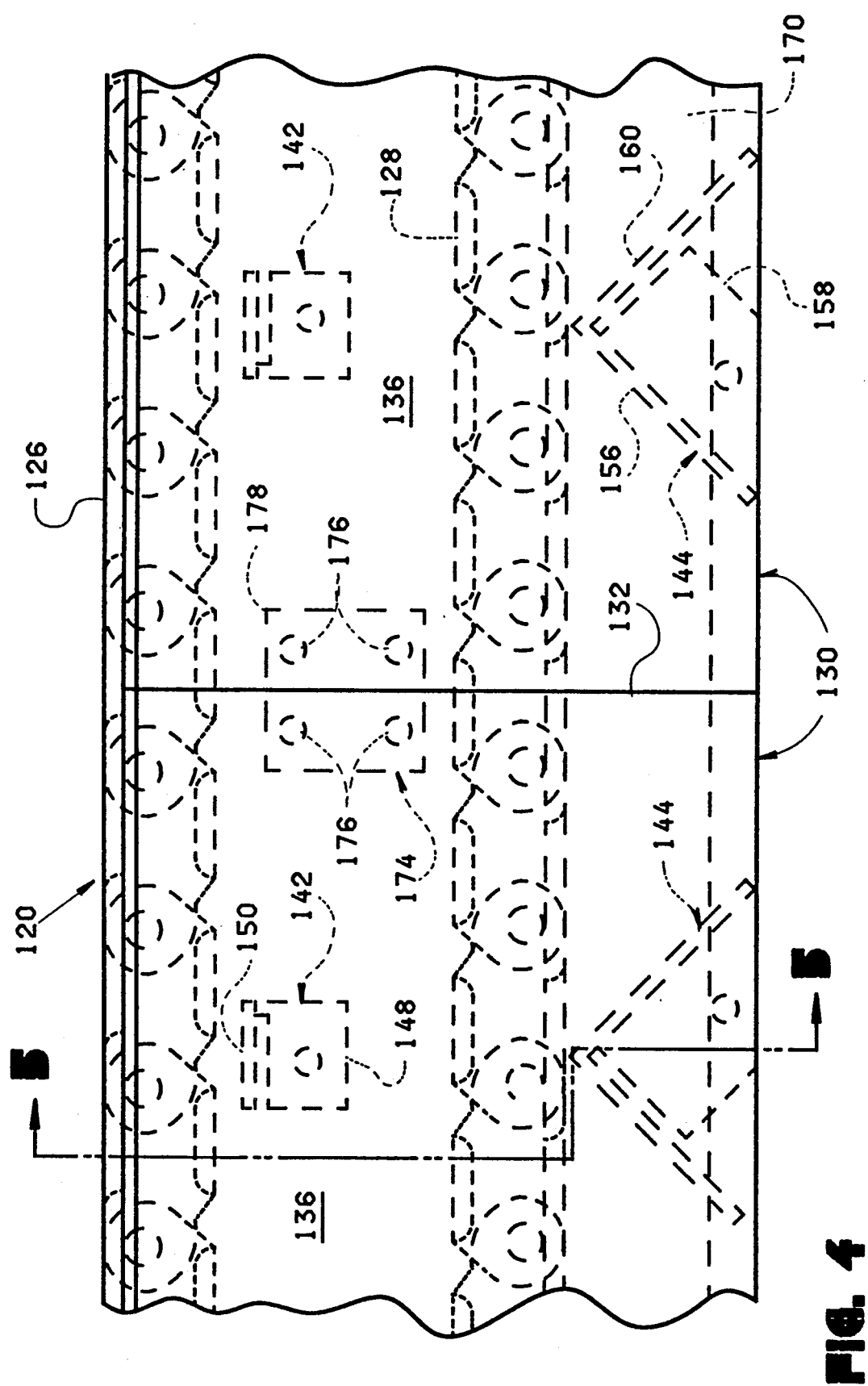
FIG. 4 is a side view of a second embodiment modular conveyor.
Figure 5:
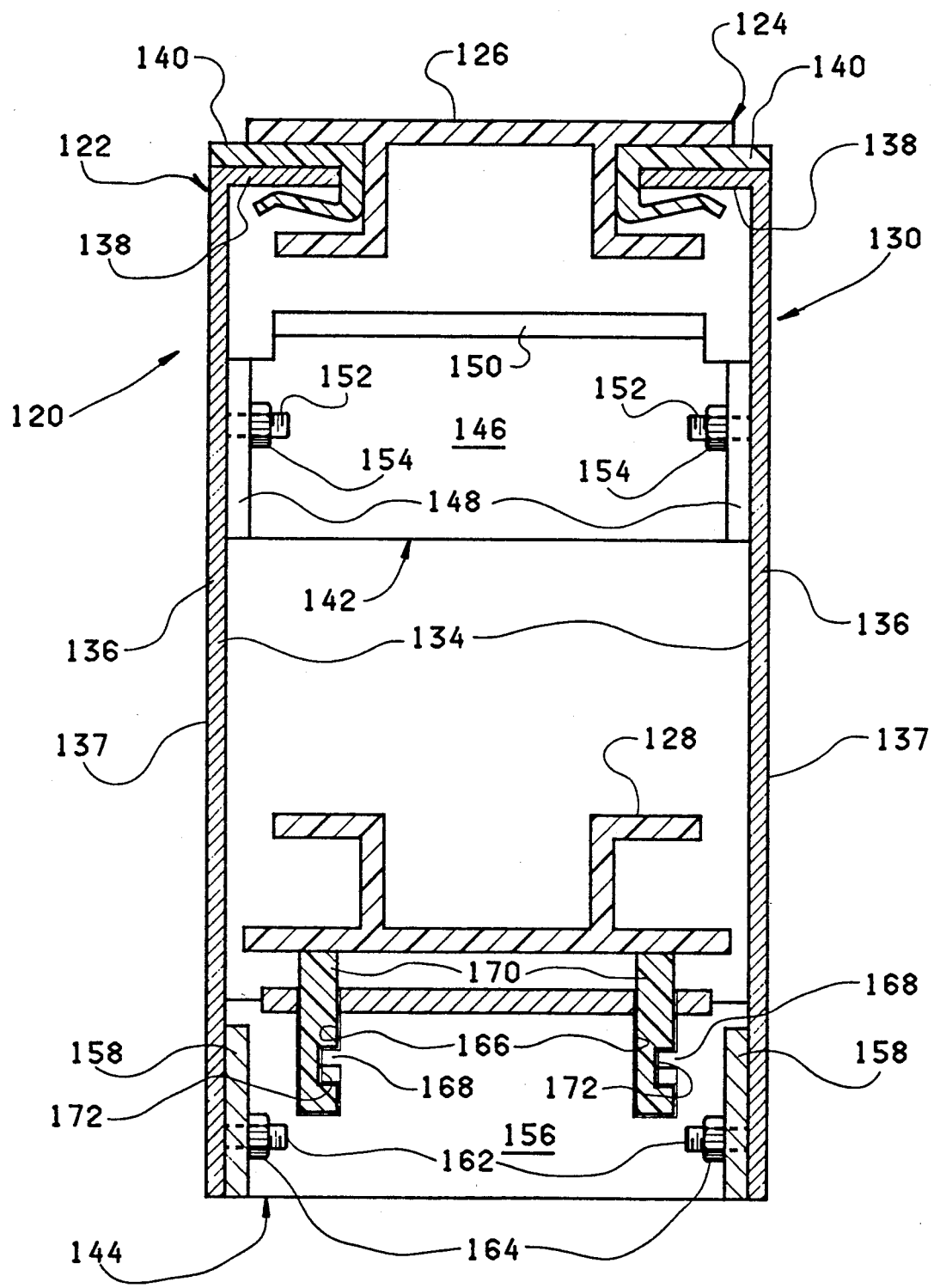
FIG. 5 is a sectional view taken along 5—5 of FIG. 4.

FIGS. 4 and 5 illustrate a second embodiment modular conveyor 120 having an elongate conveyor frame 122 and a continuous conveyor belt 124, similar to belt 14, with upper and lower runs 126 and 128. The frame is made up of a number of series mounted guidetrack segments 130 joined together end to end at tight vertical joints 132 shown in FIG. 4.

Guidetrack segments 130 are preferably formed from aluminum sheet metal, carbon steel sheet metal or stainless steel sheet metal and include flat sidewalls 134 having imperforate flat and smooth and sides 136. Sidewalls 134 parallel each other and are spaced apart a distance sufficient to accommodate the lower runs of conveyor belt 124 between the sidewalls. The upper conveyor belt run 126 is supported on inwardly bent flanges or ribs 138 located at the tops of the sidewalls 134. U-shaped wear strips 140 are fitted on ribs 138.

The sidewalls 136 are secured together in the sidetrack segment by a plurality of upper cross members 142 and lower cross members 144 which are bolted to studs welded to the inner surfaces of the sidewalls.

The upper cross member 142 includes a cross plate 146 extending between the sidewalls 136, mounting flanges 148 bent 90 degrees to one side of the cross plate at the ends of the plate and a stiffening flange 150 extending along the length of the cross plate and projecting away from the cross plate at a 90-degree angle. Mounting bores are formed through the flanges 148.

Threaded studs 152 are butt-welded to the inner surfaces of the sidewalls 134 without injury to the outer surfaces 136 of the walls. The upper cross members are secured to the walls 134 by extending studs 152 through the bores in flanges 148 and threading nuts 154 onto the free ends the studs as shown in FIG. 5.

Each lower cross member 144 includes a cross plate 156, mounting flanges 158 at the end of the cross plate and a stiffening flange 160 extending 90 degrees away from one edge of the cross plate. Studs 162 are butt-welded to the interior surfaces of sidewalls 136 without injury to the outer surfaces as illustrated. The lower cross members are mounted to the sidewalls by extending studs 162 through bores formed in flanges 158 and then threading nuts 164 on the free ends of the studs as illustrated in FIG. 5.

The lower mounting members 144 are preferably mounted with the junction between the cross plate and stiffening flange located at the tops of the members so that the plate and flange angle downwardly away from the junction to form roofs extending across the interior width of the guidetrack segments for guiding liquids and debris that may fall down from the conveyor out from the interior of the guidetrack.

If desired, the upper cross members 142 may be positioned similarly to cross members 144 with the intersection between the cross plate and flange at the top of the member so that plate and flange serve as grooves to guide liquids and debris falling into the conveyor out from the interior of the guidetrack.

As shown best in FIG. 5, a pair of spaced slots 166 are formed in the top of the lower cross members 144 with lock tabs 168 extending into the slots. The slots are formed in both the cross plate and stiffening flange. Elongate wear strips 170, which may be formed from suitable low friction plastic material, are fitted into the slots 166 and are supported in the bottom of the slots as shown in FIG. 5. The strips extend along the length of the frame 122. Lock tabs 168 extend into grooves 172 in the strips to confine the strips in place in the cross members. The return run 128 of conveyor belt 124 is supported on the wear strips 170.

Adjacent guidetrack segments 130 are secured together at joints 132 by two splice connections 174 as illustrated in FIG. 4. Two studs 176, like studs 152 and 162, are butt-welded to the inner surface of the sidewalls 134 adjacent at the ends of each guidetrack segment. The studs do not injure the exterior surfaces of the sidewalls. A rectangular splice plate 178 is provided with appropriate holes at the location of the studs 176 and is fitted over the studs and held in place against the inner surfaces of the sidewalls by threading nuts (not illustrated) onto the free ends of the studs. The two-plate splice connections hold the guidetrack sections tightly together in abutting relationship to maintain the tight vertical joints 132.

Conveyor 120 may be provided with guide rails similar to guide rails 16 shown in FIG. 1 with the guide rail support brackets spaced from the sidewalls, extending downwardly along the sidewalls and connected to the guidetrack segments by studs butt-welded to the inner surface of the sidewalls adjacent the bottom of the sidewalls. Likewise, the conveyor 120 may use a conveyor support system similar to system 102 shown in FIG. 3 with connections to studs butt-welded to the inner surface of the bottom of the sidewalls.

The conveyor support system 102 for conveyors 10 and 90 is connected to the individual guidetrack segments using extrusion-formed recesses at the bottoms of the sidewalls. The guiderail brackets are also connected to the segments using the same recesses. If desired, the support system and guiderail brackets may be attached to extruded guidetrack segments by connections other than connections using extruded recesses, provided the integrity of the outer surfaces of the sidewalls is maintained. For instance, the support systems and bracket can be mounted using studs attached to the inner surfaces of the lower ends of the sidewalls without penetrating through the outer surfaces. Other types of attachment means may be provided.

Likewise, guiderail brackets and conveyor support systems may be secured to the guidetrack segments of conveyor 120 without the using butt-welded studs, provided the integrity of the outer surfaces of the sidewalls is maintained.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A guidetrack segment for a modular conveyor; the segment comprising a pair of elongate spaced apart sidewalls, said sidewalls extending generally parallel along the length of the segment and having tops and bottoms; sidewall connection means located between the sidewalls for joining the sidewalls together, a first pair of ribs extending inwardly from the tops of the sidewalls above the sidewall connection means for supporting an upper run of a conveyor belt; conveyor support means below the sidewall connection means for supporting a lower run of a conveyor belt, said conveyor support means comprising mounting means located on the inside of the sidewalls adjacent the bottoms of the sidewalls for forming connections with a conveyor support system; exterior surfaces on the sidewalls extending continuously between the tops and the bottoms of the sidewalls and ends of the segment, such surfaces being smooth, imperforate and recess free to facilitate cleaning and a second pair of ribs extending inwardly from the sidewalls and including a third pair of ribs extending inwardly from the sidewalls between said second pair of ribs and said mounting means, the length of the ribs in said third pair of ribs being less than the length of the ribs in said second pair of ribs.

2. A guidetrack segment for a modular conveyor; the segment comprising a pair of elongate spaced apart sidewalls, said sidewalls extending generally parallel along the length of the segment and having tops and bottoms; sidewall connection means located between the sidewalls for joining the sidewalls together, a first pair of ribs extending inwardly from the tops of the sidewalls above the sidewall connection means for supporting an upper run of a conveyor belt; conveyor support means belong the sidewall connection means for supporting a lower run of a conveyor belt; mounting means located on the inside of the sidewalls adjacent the bottoms of the sidewalls for forming connections with a conveyor support system; and exterior surfaces on the sidewalls extending continuously between the tops and the bottoms of the sidewalls and ends of the segment, such surfaces being smooth, imperforate and recess free to facilitate cleaning; said segment comprising an integral metal extrusion and said sidewall connection means including a first plate extending between the sidewalls immediately under said first pair of ribs and a cross member located between said plate and said conveyor support means.

3. A guidetrack segment as in claim 2 including vertical interior walls joining said plate and said cross member and a pair of recesses in the cross member for forming a splice connection with an adjacent like guidetrack segment.

4. A guidetrack segment as in claim 3 wherein the segment is formed from an integral metal extrusion.

5. A guidetrack segment for a modular conveyor; the segment comprising a pair of elongate spaced apart sidewalls, said sidewalls extending generally parallel along the length of the segment and having tops and bottoms; sidewall connection means located between the sidewalls for joining the sidewalls together, a first pair of ribs extending inwardly from the tops of the sidewalls above the sidewall connection means for supporting an upper run of a conveyor belt; conveyor support means below the sidewall connection means for supporting a lower run of a conveyor belt; mounting means located on the inside of the sidewalls adjacent the bottoms of the sidewalls for forming connections with a conveyor support system; and exterior surfaces on the sidewalls extending continuously between the tops and the bottoms of the sidewalls and ends of the segment, such surfaces being smooth, imperforate and recess free to facilitate cleaning; said sidewalls connection means comprises a plurality of sheet metal cross members spaced along the length of the segment, each member extending between the interior surfaces of the sidewalls and including a cross plate, flanges on the ends of the plate, bores through the flanges; and threaded mounting studs butt-welded to the interior surfaces of the sidewalls without penetrating the sidewalls; said studs extending through the bores and nuts on the ends of the studs.

6. A guidetrack segment as in claim 5 including a stiffening flange on each said plate.

7. A guidetrack segment as in claim 5 wherein a plurality of cross members are located at the bottom of the sidewalls and said conveyor support means comprises wear strips extending along the segment, said plurality of cross members supporting said wear strips.

8. A guidetrack segment as in claim 7 including upwardly facing slots in such plurality of cross members, such wear strips being fitted in such slots.

9. A guidetrack segment as in claim 8 including groove and finger connections securing the wear strips to the slots.

10. A guidetrack segment as in claim 5 wherein said surfaces are flat.

11. A guidetrack segment as in claim 10 wherein said surfaces are smooth.

* * * * *